March 31, 1964  W. F. SAWYER  3,126,767
TOOL FEED MECHANISM
Filed July 23, 1962  5 Sheets-Sheet 1
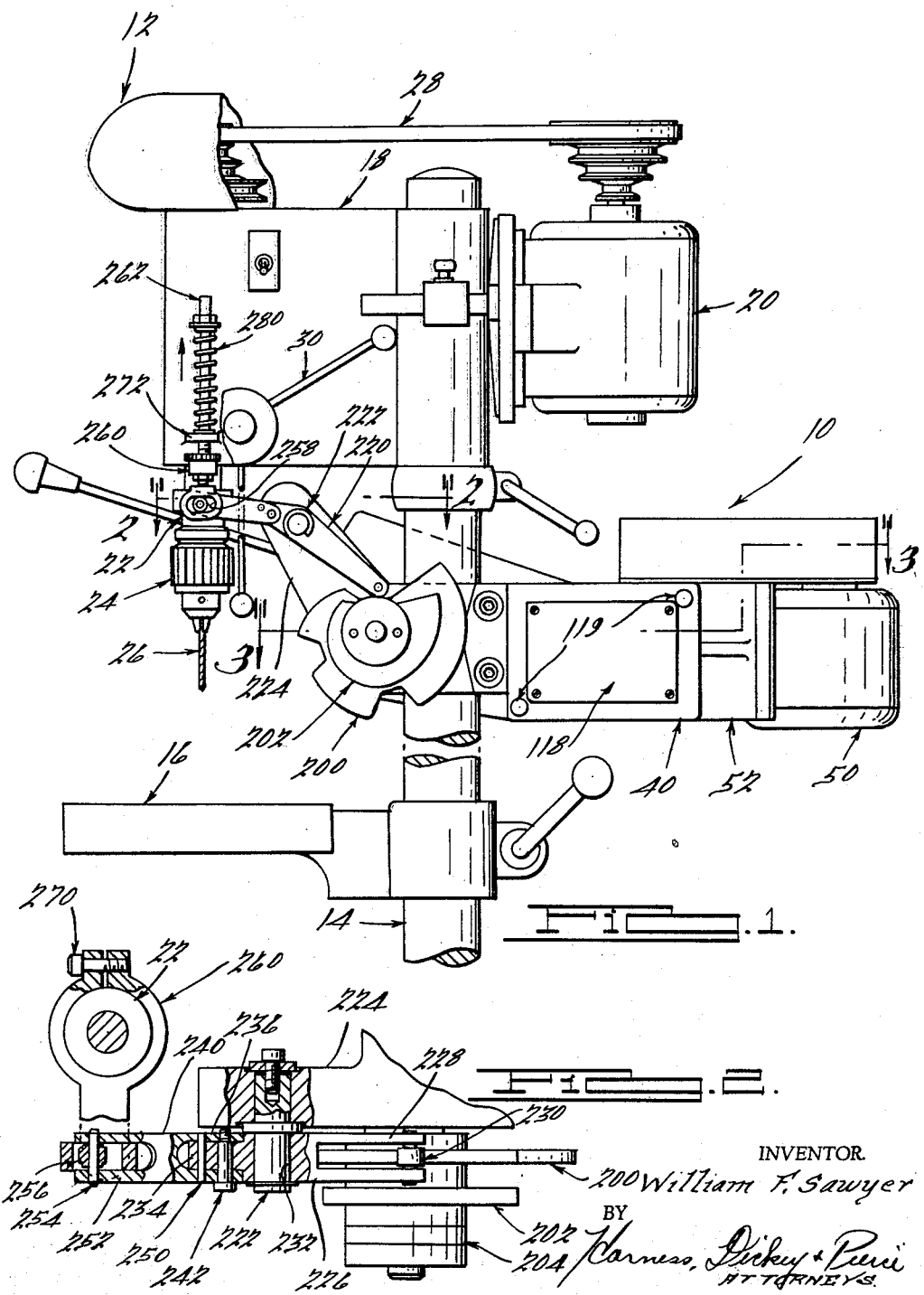

March 31, 1964 W. F. SAWYER 3,126,767
TOOL FEED MECHANISM
Filed July 23, 1962 5 Sheets-Sheet 2
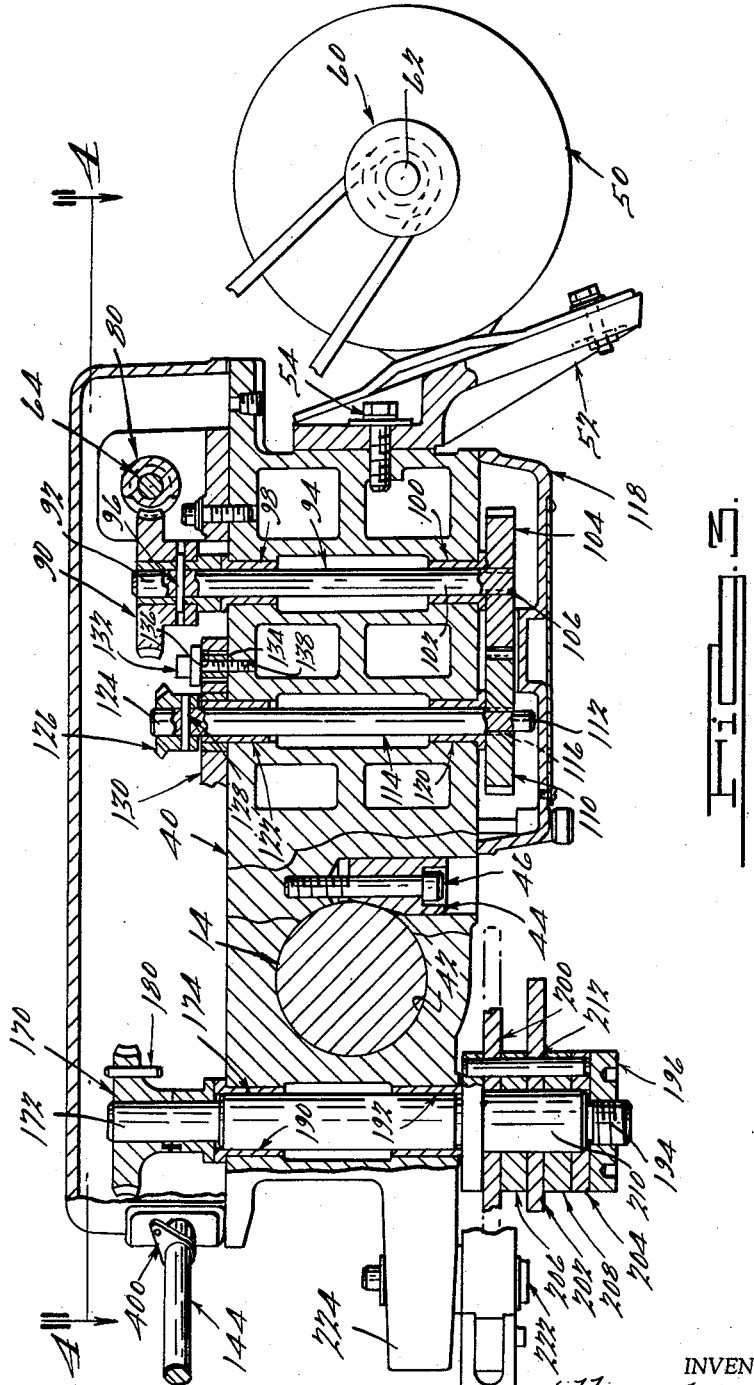
INVENTOR.
William F. Sawyer
BY
Harness, Dickey & Pierce
ATTORNEYS.

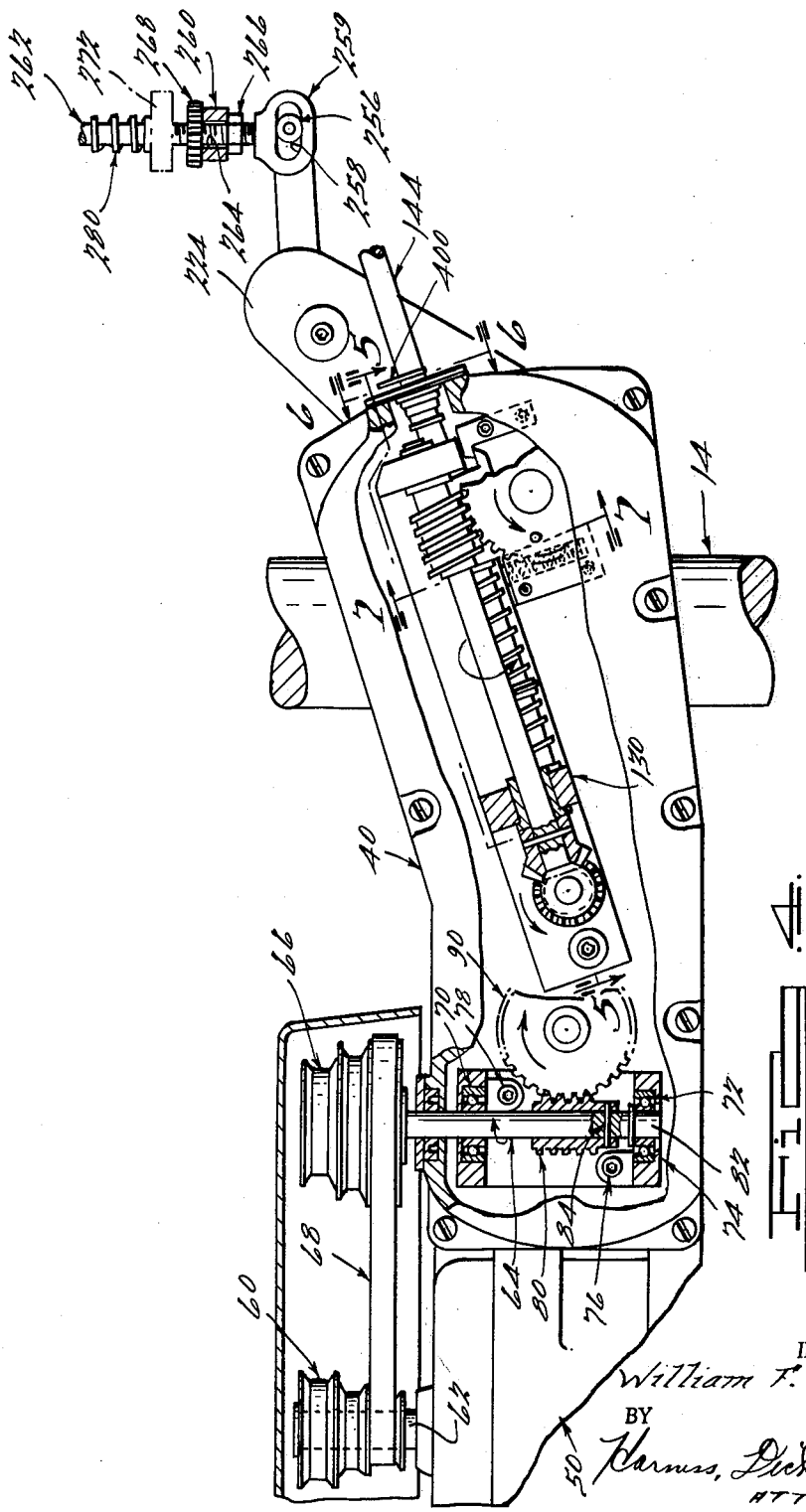

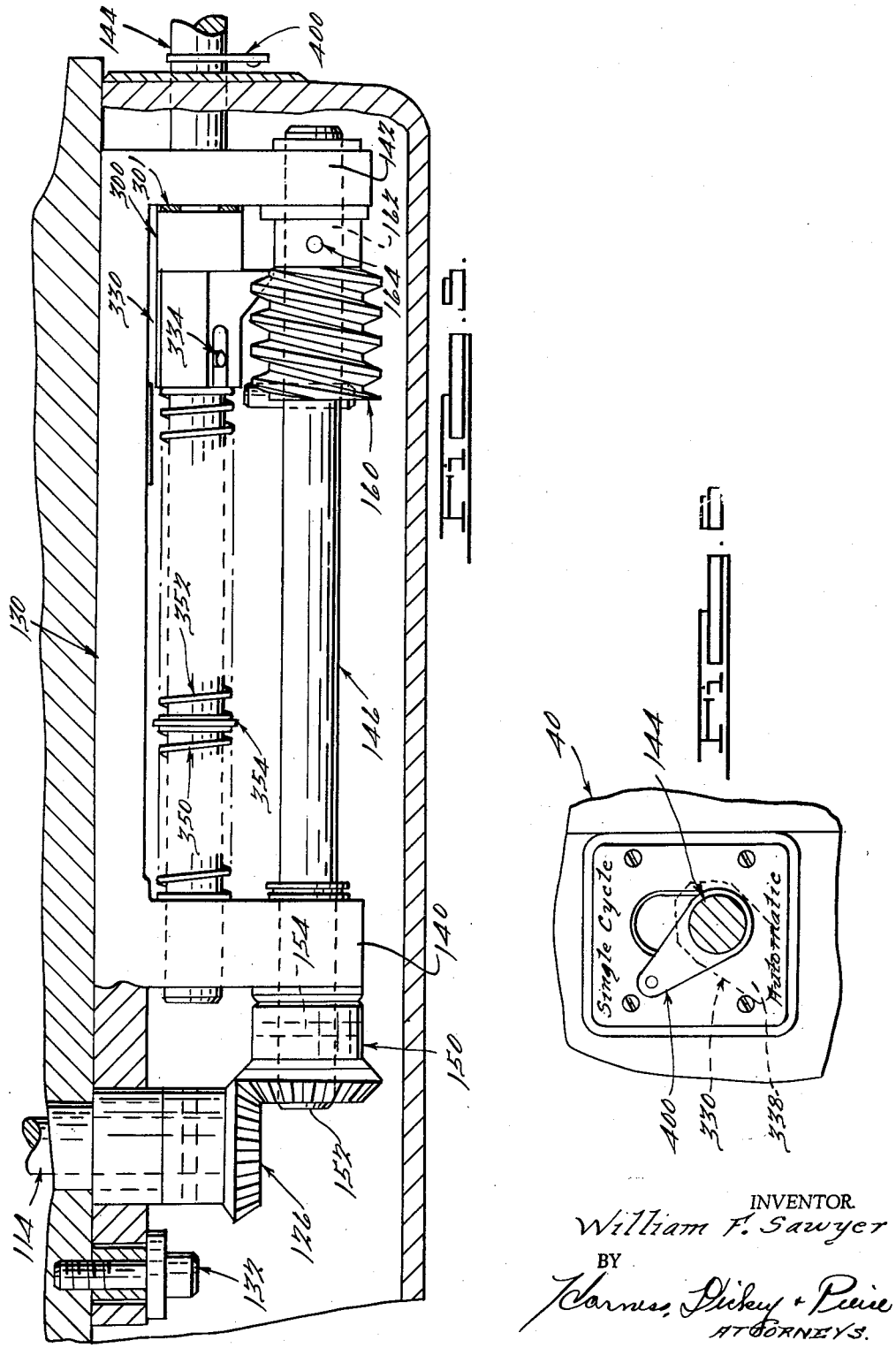

March 31, 1964     W. F. SAWYER     3,126,767
TOOL FEED MECHANISM
Filed July 23, 1962     5 Sheets-Sheet 5
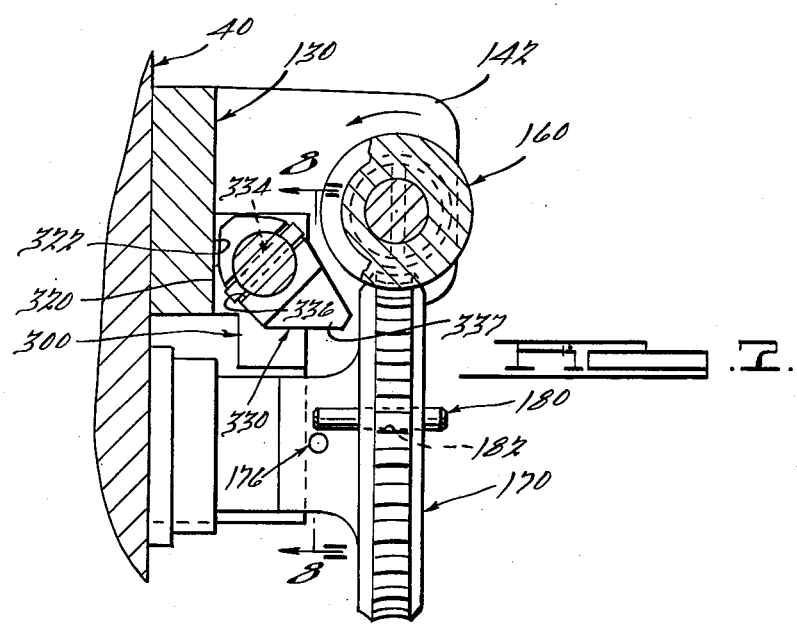
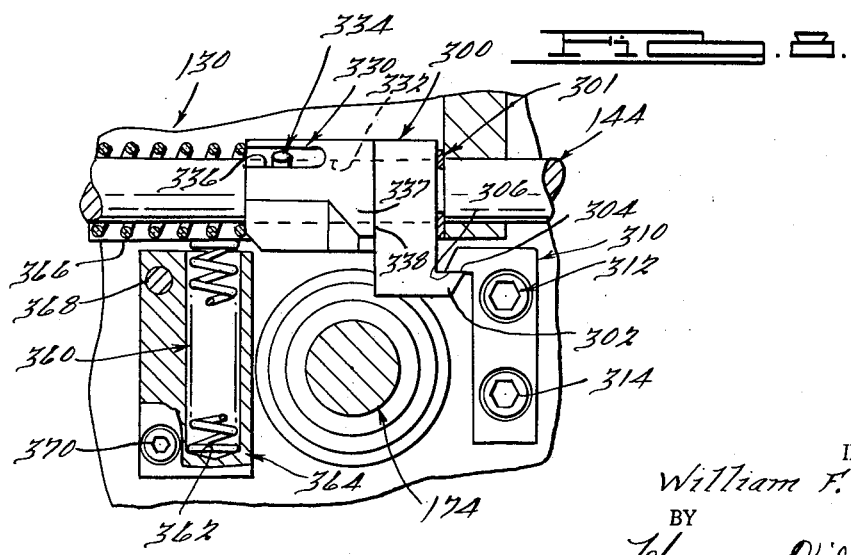
INVENTOR.
William F. Sawyer
BY
Harness, Dickey & Pierce
ATTORNEYS.

United States Patent Office 3,126,767
Patented Mar. 31, 1964

3,126,767
TOOL FEED MECHANISM
William F. Sawyer, Brighton, Mich., assignor to King-Seeley Thermos Co., Ann Arbor, Mich., a corporation of Michigan
Filed July 23, 1962, Ser. No. 211,578
4 Claims. (Cl. 77—33.4)

This invention relates generally to tool feed mechanisms and more particularly to an improved cam controlled tool feed mechanism for controlling the spindle of a utility machine tool.

It is often desired to convert conventional utility machine tools, for example, a column-mounted drill press, to automatic or semi-automatic operation to increase accuracy, production rates, etc. Preferably, such a conversion is accomplished by employing a tool feed mechanism that is as versatile as the utility machine tool to which it is applied, so that the automated tool remains a utility tool insofar as its adaptability to diverse manufacturing requirements.

In order to be relatively versatile in operation, a tool feed mechanism should provide for automatic, semi-automatic or manual control, selectively. The feed mechanism should be relatively easily disengaged, irrespective of the mode of operation to render operation of the machine tool completely safe. Also, changes in the feed sequence of the tool, as well as in cycle speed thereof, should be easily accomplished.

A tool feed mechanism in accordance with the instant invention features a single control movable to effect fully automatic, semi-atuomatic or manual operation, selectively. The control is movable to effect coupling and uncoupling of the drive train of the tool feed mechanism, thereby rendering operation of the machine tool relatively positive and safe. The tool feed mechanism of the instant invention is powered by its own prime mover, thereby to insure that adequate power is available for advancement of the tool spindle relative to a workpiece.

The tool feed mechanism of the instant invention features the use of one or more cams which control advancement and retraction of a tool spindle relative to a workpiece, as well as auxiliary functions such as, for example, actuation of coolant valves, extractor mechanisms, and part-feed mechanisms. The characteristics of the feed cycle can be varied by using cams of different rise characteristics. Cams are relatively easily changed, due to their disposition relative to the spindle of the machine tool.

The speed of the feed cycle can be controlled by varying the relationship between a complementary pair of timing gears in the drive train. The timing gears are easily accessible to facilitate change. The tool feed mechanism is relatively easily attached to, for example, the column and spindle of a conventional drill press by a simple nut and bolt attachment.

Accordingly, one object of the instant invention is an improved tool feed attachment having its own prime mover.

Another object is a tool feed mechanism having provision for rapid change of cycle time.

Another object of the instant invention is a tool feed mechanism having a multiplicity of function-control cams.

Another object of the instant invention is a tool feed mechanism for a machine tool having a single control movable between a multiplicity of function control positions.

Another object of the instant invention is a tool feed mechanism having provision for quick release of the drive train thereof to render operation relatively safe.

Other objects and advantages of the instant invention will be apparent from the following specification, claims and drawings, wherein:

FIGURE 1 is a side plan view of a conventional drill press having the tool feed mechanism of the instant invention secured thereto;

FIG. 2 is a cross sectional view taken substantially along the line 2—2 of FIGURE 1;

FIG. 3 is a cross sectional view taken substantially along the line 3—3 of FIGURE 1;

FIGURE 4 is a cross sectional view taken substantially along the line 4—4 of FIG. 3;

FIG. 5 is a cross sectional view taken substantially along the line 5—5 of FIG. 4;

FIG. 6 is a cross sectional view taken substantially along the line 6—6 of FIG. 4;

FIG. 7 is a cross sectional view taken substantially along the line 7—7 of FIG. 4; and FIG. 8 is a cross sectional view taken substantially along the line 8—8 of FIG. 7.

As best seen in FIGURE 1 of the drawings, a tool-feed mechanism 10, in accordance with an exemplary constructed embodiment of the instant invention, is shown in operative association with a machine tool 12, for example, a conventional drill press. It is to be understood that the tool feed mechanism 10 has utility for use with other machine tools having a tool-supporting spindle or the like and is disclosed in association with the drill press 12 for the purpose of explanation.

The drill press 12 comprises an upstanding column or fixed member 14 having a workpiece-supporting table 16 adjustably secured thereto. A head casting 18 is secured to the column 14 for the support of an electric motor 20 and for journaling of a tool-supporting spindle 22. The spindle 22 may be provided with a conventional chuck 24 to facilitate retention of a conventional twist drill 26. The spindle 22 is driven by the electric motor 20 by, for example, a V-belt 28.

Reciprocal movement of the spindle 22 of the drill press 12 relative to the head portion 18 thereof is normally effected by rotating a spoked hand wheel 30 which drives the spindle 22 through a conventional rack and gear mechanism (not shown).

The tool feed mechanism 10 of the instant invention comprises a housing 40, preferably a malleable iron casting, having a central aperture 42 therein (FIG. 3) for the acceptance of the column 14 of the drill press 12. The housing 40 is secured to the column 14 as by a barrel lock 44 that is advanceable against the column 14 as by a machine screw 46.

As best seen in FIG. 3 of the drawings, an electric motor 50 is mounted on a motor bracket 52 that is secured to the housing 40 as by a plurality of machine screws 54. The electric motor 50 effects drive of the tool feed mechanism 10, as will be described.

As best seen in FIG. 4 of the drawings, a conical pulley 60 is mounted on an output shaft 62 of the motor 50 to effect drive of a vertically orientated worm shaft 64 through a complementary cone pulley 66 and a positive drive V-belt 68. The worm shaft 64 is journaled in suitable bearings 70 and 72 that are supported by a bearing block 74. The bearing block 74 is affixed to the housing 40 as by a pair of machine screws 76 and 78.

A worm 80 is drivably secured to a lower end portion 82 of the worm shaft 64 as by a drive pin 84. The worm 80 is disposed in complementary meshing engagement with a worm gear 90 that, as best seen in FIG. 3 of the drawings, is supported by one end portion 92 of a timing gear shaft 94. A drive pin 96 secures the worm gear 90 to the shaft 94 and transmits torque therebetween.

The timing gear shaft 94 is journaled in suitable bushings 98 and 100 in the housing 40, an end portion 102 thereof being drivably connected to a timing gear 104 by a spline 106.

A timing gear 110 having a pitch and pitch diameter complementary to the timing gear 104 to effect a desired speed ratio, is drivably connected to an end portion 112 of a timing gear countershaft 114 by a spline pin 116. A suitable cover plate 118 is removably secured to the housing 40 as by a pair of thumb screws 119 to normally enclose the gears 104 and 110.

The timing gear countershaft 114 is journaled in a pair of aligned bushings 120 and 122 in the housing 40, an opposite end portion 124 thereof being drivably connected to a miter gear 126, as by a drive pin 128.

It is to be noted that the bushing 122 in the housing 40 which journals the end portion 124 of the timing gear countershaft 114, also rotatably supports a pivot plate 130, the function of which will de described hereinafter. Movement of the pivot plate 130 axially of the timing gear countershaft 114 is restrained by a machine screw 132 that extends through a spacer 134 disposed within a complementary aperture 136 in the pivot plate 130. The machine screw 132 is threadably engaged in a complementary bore 138 in the housing 40.

As best seen in FIG. 5 of the drawings, the pivot plate 130 has a pair of laterally extending flanges 140 and 142 thereon for the support of a manual operator or control rod 144 and for journaling of a miter gear shaft 146. The miter gear shaft 146 has a miter gear 150 complementary to the miter gear 126 on the timing gear countershaft 114, drivably secured to an end portion 152 thereof as by a drive pin 154. The shaft 146 also has a worm 160 drivably secured to an end portion 162 thereof as by a drive pin 164.

As best seen in FIG. 7 of the drawings, the worm 160 is engageable with a complementary worm gear 170 that is drivably secured to an end portion 172 (FIG. 3) of a cam shaft 174, as by a drive pin 176. It is to be noted that the worm gear 170 has an axially extending pin 180 extending through a bore 182 therein in radially spaced relation to the central axis of the cam shaft 174, the purpose of which will be described hereinafter.

As best seen in FIG. 3, the cam shaft 174 is journaled in complementary bushings 190 and 192 in the housing 40, an end portion 194 thereof being threaded for the acceptance of a complementary cam retainer 196. A plurality of cams 200, 202 and 204 having spacers 206 and 208 therebetween, are mounted on an intermediate portion 210 of the cam shaft 174 and are maintained in drivably keyed and rotationally indexed relationship thereto as by a pin 212.

As best seen in FIGURES 1 and 2 of the drawings, a cam follower, generally designated by the numeral 220, is rotatably journaled on a cam follower shaft 222 that is supported by an upstanding arm 224 of the housing 40. As seen in FIG. 2, the cam follower 220 comprises a lower arm 226 having a forked lower end portion 228 for the support of a cam roller 230. The lower arm 226 has a transverse bore 232 for the acceptance of the cam follower shaft 222 and an opposite end of finger portion 234 that is accepted between a complementary yoke portion 236 of an upper arm portion 240 of the cam follower 220. The finger portion 234 of the lower arm 226 is pivotally coupled to the yoke portion 236 of the upper arm 240 by a machine screw 242, relative rotation therebetween being normally restrained by a shear pin 250. A forked outer end portion 252 of the upper arm 240 has a laterally extending roller shaft 254 thereon for the acceptance of a spindle roller 256.

As best seen in FIG. 4, the roller 256 is accepted in a complementary elongated aperture 258 in a yoke 259. The yoke 259 is secured to a spindle bracket 260, as by a threaded rod 262 that is threadably engaged with the yoke 259. The rod 262 extends through a relatively larger aperture 264 in the spindle bracket 260, being adjustably positioned relative thereto as by a conventional nut 266 and a finger nut 268. The spindle bracket 260 is adapted to be clamped about the spindle 22 of the drill press 12 as by tightening a machine screw 270 (FIG. 2).

As best seen in FIGS. 1 and 4 of the drawings, a helical compression spring 280 is disposed about the rod 262 and extends between a flange 272 on the head 18 of the drill press 12 and a nut 274 on the rod 262 to normally bias the spindle 22 upwardly relative to the drill head 18. The normal bias of the spring 280 also normally biases the cam follower 220 clockwise about the cam follower shaft 22, maintaining the cam roll 230 in engagement with the cam 200 at all times.

As best seen in FIG. 8 of the drawings, a trigger 300 having a flanged lower end portion 302 with a face 304 thereon, is freely supported by the control rod 144. The trigger 300 is disposed in juxtaposed relation to a spring collar 301 on the rod 144, the function of which will be described.

The face 304 of the trigger 300 is engageable with a complementary latch surface 306 on a latch 310 that is secured to the housing 40 as by a pair of machine screws 312 and 314. As best seen in FIG. 7 of the drawings, the trigger 300 is restrained from rotation relative to the plate 30 upon rotation of the control rod 144 due to engagement of a flat side face 320 on the trigger 300 with a complementary face 322 on the pivot plate 130.

As best seen in FIGS. 7 and 8, a pawl 330 has a central bore 332 for the acceptance of the control rod 144 in slidable relationship. The control rod 144 has a transverse pin 334 therein that is accepted in a complementary slot 336 in the pawl 330 to function as a lost motion connection therebetween, as will be described.

The pawl 330 has a downwardly extending finger portion 337 with a radial face 338 thereon that is engageable by the pin 180 on the worm gear 170 upon rotation of the gear 170, to effect single cycle operation, as will be described.

As best seen in FIG. 5, the control rod 144 is normally biased to the right or axially outwardly of the housing 40 by a pair of helical compression springs 350 and 352. The compression spring 350 extends between a collar 354 on the rod 144 and the flange 140 on the pivot plate 130 and the spring 352 extends between the collar 354 and the pawl 330. The spring 350 is relatively stiffer than the spring 352 to permit movement of the pawl 330 under the bias of the pin 180 on the worm gear 170 without effecting movement of the rod 144 until such time as the end of the slot 336 in the pawl 330 engages the pin 334 in the rod 144.

As best seen in FIG. 8, a helical compression spring 360 extends between a complementary seat 362 in a spring retainer 364 and a lower edge face 366 of the pivot plate 130. The spring retainer 364 is secured to the housing 40 as by a pair of machine screws 368 and 370. The spring 360 maintains a constant counterclockwise bias on the pivot plate 130 (as seen in FIGS. 4 and 8 of the drawings) relative to the housing 40, which bias tends to urge the face 304 of the trigger 300 into engagement with the latch surface 306, and, when the trigger 300 is released from engagement with the latch 310, urges the pivot plate 130 counterclockwise carrying the worm 160 out of engagement with the gear 170.

In operation, as discussed hereinbefore, drive of the tool feed mechanism 10 is effected by the motor 50, the output shaft 62 of which drives the cone pulley 60. The pulley 60 drives the belt 68 and the pulley 66 on the worm shaft 64. Rotation of the worm shaft 64 effects rotation of the worm 80 and worm gear 90 to effect drive of the timing gear shaft 94. Rotation of the timing gear shaft 94 effects drive of the timing gear countershaft 114 through the interchangeable timing gears 104 and 110. The user of the tool feed mechanism 10 would be furnished with matched sets of timing gears 104 and 110 having different tooth ratios so that a multiplicity of feed rates can be arrived at. Access to the timing gears 104 and 110 is afforded by the cover plate 118 which is secured to the housing 40, as by the machine screws 119.

The output end 124 of the timing gear countershaft 114 carries the bevel gear 126, which continuously meshes with the bevel gear 150 on the end portion 152 of the miter gear shaft 146. In turn, the miter gear shaft 146 carries a worm 160, which releasably engages the worm gear 170. The worm gear 170 drives the cam shaft 174, which, at its other end, carries the cams 200, 202 and 204.

Drive of the cam shaft 174 is effected by moving the worm 160 into meshing relation with the worm gear 170. This is accomplished by movement of the control rod 144 and pivot plate 130 clockwise about the center of the timing gear countershaft 114.

The spring 352 which surrounds the rod 144 and acts between the collar 354 thereon against the pawl 330 carried by the shaft or rod 144 continuously urges the pawl and the trigger 300 carried by the shaft or rod 144 toward the engaged position with the latch 310 on the housing 40 of the feed mechanism. Thus, when the control rod 144 is moved clockwise sufficiently far, the trigger 300 is biased into engagement with the latch 310 to maintain the worm 160 engaged with the worm gear 170.

Release of the worm 160 from the worm gear 170 can be effected by pushing the shaft or rod 144 inwardly or to the left as seen in FIGS. 5 and 8, thus releasing the trigger 300 from the catch 310 and allowing the pivot plate 130 to move counterclockwise about the central axis of the timing gear countershaft 114 under the bias of the helical compression spring 360. Release of the worm 160 from the worm gear 170 in this manner can be effected at any time merely by pushing on the rod 144 and is thus a distinct safety feature.

Conversely, engagement of the worm 160 with the worm gear 170 and thus initiation of the feed cycle can be undertaken at any time merely by removing the control rod 144 downwardly so that the trigger 300 catches behind the latch 310 holding the worm 160 in engagement with the worm gear 170.

In order to provide automatic release of the worm 160 from the gear 170 at the end of, for example, one feed cycle which is completed at one complete revolution of the cam 200, the rod 144 is rotated counterclockwise about its own axis, as seen in FIG. 6 of the drawings, so that when the pointer 400 thereon is in the automatic position, the pawl 330 is positioned so that the face 338 on the finger portion 337 thereof will be engaged by the pin 180 on the worm gear 170 as it rotates. When the pin 180 strikes the pawl 330, it biases the pawl 330 to the left against the bias of the spring 352. When the end of the slot 336 in the pawl 330 engages the pin 334 on the rod 144, the rod 144 is biased to the left against the bias of spring 350, as seen in FIG. 8 of the drawings. Movement of the rod 144 to the left effects a similar movement of the trigger 300 due to engagement thereof by the collar 301, thereby freeing the trigger 300 from the latch 310 and conditioning the pivot plate 130 for movement counterclockwise under the bias of the spring 360, thereby to disengage the worm 160 from the worm gear 170 and intercept the drive train to the cam shaft 174.

Rotation of the control rod 144 clockwise, as seen in FIG. 6 of the drawings, moves the pawl 330 to a position wherein the pin 180 on the worm gear 170 clears the finger portion 337 on the pawl 330, thereby allowing continuous rotation of the worm 160, worm gear 170, and cam shaft 174 and automatic repetition of the feed cycle.

From the foregoing description, it should be apparent that the tool feed mechanism of the instant invention renders a conventional utility machine tool capable of automatic or semi-automatic operation, thereby increasing the accuracy and production rate of the machine. The tool feed mechanism is relatively easily attached to the machine tool. The tool feed mechanism is self-powered, thereby facilitating integration of the feed mechanism with a machine tool.

It is also to be noted that attachment of a cam follower mechanism to the movable spindle of the tool is relatively easily accomplished by merely clamping the spindle bracket about the machine tool spindle. Therefore, micrometer adjustment of the relationship of the cam follower arm to the machine tool spindle provides for minor adjustments after assembly of the tool feed mechanism with the machine tool.

The matched pairs of timing gears are relatively easily changed by simply removing the cover plate of the housing. It is contemplated that any number of timing gear sets can be provided as desired by the application of the tool feed mechanism.

Each gear ratio for the timing gears results in a particular time for one complete feed cycle.

The cam shaft of the tool feed mechanism provides for mounting of a plurality of cams, one of which effects articulation of the cam follower arm, the others of which may be utilized to energize coolant valves, feed devices, etc. The cams, like the timing gears, are relatively easily changed.

It is also to be noted that when the tool being advanced by the tool feed mechanism strikes an impedance sufficient to overload the tool feed mechanism, the shear pin in the cam follower arm relieves both the tool and the tool feed mechanism.

From the foregoing description, it should also be apparent that absolute control of the tool feed mechanism is possible by only a single control rod. The control rod is movable in one direction to effect engagement of the drive train for the tool feed mechanism, and in another direction to effect disengagement.

An appropriate locking means is provided to hold the control rod in the engaged condition. Rotation of the control rod in one direction conditions the drive train for continuous engagement, whereas rotation in the opposite direction conditions the latch mechanism for the control to be disengaged at the end of a complete feed cycle. Thus, the tool feed mechanism is capable of semi-automatic or single cycle operation by merely moving the control rod in the appropriate direction.

It is also to be noted that a push on the control rod effects disengagement of the drive train for the tool feed mechanism, thereby to operate as a deadman's switch to increase the safety factor of the tool feed mechanism.

It is to be understood that the specific construction of the improved tool feed mechanism herein disclosed and described is presented for the purpose of explanation and illustration and is not intended to indicate limits of the invention, the scope of which is defined by the following claims.

What is claimed is:

1. A tool feed mechanism for a machine tool having a fixed member and a movable tool-supporting spindle, said tool feed mechanism comprising
    a housing attachable to the fixed member of the machine tool,
    a timing gear shaft having
        a first timing gear,
    means for driving said timing gear,
    a timing gear countershaft having
        a second timing gear thereon complementary to the first timing gear,
    a cam shaft journaled in said housing having
        a cam thereon,
    a cam follower supported by said housing and engageable with said cam and with the spindle of the machine tool for controlling movement of the spindle relative to a workpiece,
    means for releasably connecting said timing gear countershaft and cam shaft, and
    a single manual control for said releasable means movable to condition said feed mechanism for automatic operation, single cycle operation, start, and stop, selectively.

2. A tool feed mechanism for a machine tool having a fixed member and a movable tool-supporting spindle, said tool feed mechanism comprising
  a housing attachable to the fixed member of the machine tool,
  a timing gear shaft having
    a first timing gear,
  means for driving said timing gear,
  a timing gear countershaft having
    a second timing gear thereon complementary to the first timing gear,
  a cam shaft journaled in said housing having
    a cam thereon,
  a cam follower supported by said housing and engageable with said cam and with the spindle of the machine tool for controlling movement of the spindle relative to a workpiece,
  means for releasably connecting said timing gear countershaft and cam shaft including
    a latch on said housing, and
  a single manual control for said releasable means having
    a trigger thereon engageable with the latch on said housing to retain said timing gear countershaft and cam shaft in driving relation, movement on said manual control in one direction effecting engagement of the trigger with the latch, and movement in another direction effecting disengagement.

3. A tool feed mechanism for a machine tool having a fixed member and a movable tool-supporting spindle, said tool feed mechanism comprising
  a housing attachable to the fixed member of the machine tool,
  a timing gear shaft having
    a first timing gear removably secured thereto,
  means for driving said timing gear,
  a timing gear countershaft having
    a second timing gear thereon complementary to the first timing gear, removably secured thereto,
  a cam shaft journaled in said housing having
    a plurality of cams on one end thereof and a worm gear at the other end thereof,
  a cam follower supported by said housing and engageable with one of said cams and with the spindle of the machine tool for controlling movement of the spindle relative to a workpiece,
  a worm drivably connected to said timing gear countershaft,
  means for releasably connecting said worm with the worm gear on said cam shaft including
    a latch on said housing, and
  a single manual control for said releasable means having
    a trigger thereon engageable with the latch on said housing to retain said timing gear countershaft and cam shaft in driving relation, movement of said manual control in one direction effecting engagement of the trigger with the latch, and movement in another direction effecting disengagement of said worm from the worm gear on said cam shaft.

4. A tool feed mechanism for a machine tool having a fixed member and a movable tool-supporting spindle, said tool feed mechanism comprising
  a housing attachable to the fixed member of the machine tool,
  a timing gear shaft having
    a first timing gear removably secured thereto,
  means for driving said timing gear,
  a timing gear countershaft having
    a second timing gear thereon complementary to the first timing gear, removably secured thereto,
  a cam shaft journaled in said housing having
    a cam on one end thereof and
    a worm gear at the other end thereof, the worm gear on said cam shaft having an axially extending pin spaced radially from the axis of rotation thereof,
  a cam follower supported by said housing and engageable with the cam on said cam shaft and with the spindle of the machine tool for controlling movement of the spindle relative to a workpiece,
  a worm drivably connected to said timing gear countershaft,
  means for releasably connecting said worm with the worm gear on said cam shaft including
    a latch on said housing, and
  a single manual control for said releasable means having
    means rotatable to one position so as to be engageable by the pin on said worm gear thereby to effect disengagement of said worm from the worm gear on said cam shaft and rotatable in another direction to clear the pin on said worm gear.

References Cited in the file of this patent
UNITED STATES PATENTS

| | | |
|---|---|---|
| 736,395 | Hinckley | Aug. 18, 1903 |
| 744,396 | Pickop | Nov. 17, 1903 |